United States Patent
Shishido et al.

(12)

(10) Patent No.: US 6,279,076 B1
(45) Date of Patent: Aug. 21, 2001

(54) REPRODUCING APPARATUS AND CACHING METHOD

(75) Inventors: Yukio Shishido, Kanagawa; Shuichi Kobayashi, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/184,822

(22) Filed: Nov. 2, 1998

(30) Foreign Application Priority Data

Nov. 6, 1997 (JP) .................................................. 9-304034

(51) Int. Cl.[7] .................................................... G06F 12/00
(52) U.S. Cl. ........................ 711/113; 711/129; 711/131; 711/137; 711/171; 711/172; 711/173; 355/456; 355/464; 355/497.4; 355/440; 355/840; 355/841
(58) Field of Search ..................................... 711/113, 129, 711/137, 171–173, 133, 168; 395/456, 464, 497.02, 440, 841, 840

(56) References Cited

U.S. PATENT DOCUMENTS

| 5,187,778 | * | 2/1993 | Yamamoto et al. | .................. | 711/113 |
| 5,983,319 | * | 11/1999 | Ito | ......................................... | 711/113 |

* cited by examiner

Primary Examiner—Do Hyun Yoo
Assistant Examiner—Mehdi Namazi
(74) Attorney, Agent, or Firm—Oblon, Spivak, McClelland, Maier & Neustadt, P.C.

(57) ABSTRACT

The invention provides a method and apparatus for caching data in a highly efficient fashion during a data reproducing process thereby reducing the access time. In the case where it is determined that the type of a data request is not a sequential data request, the cache memory is divided into a plurality of memory segments and data is stored in a particular memory segment so that the existing data buffered in the cache memory is further kept in the respective segments without being entirely purged even in a mode other than the sequential reading mode. This makes it possible that the data kept in the cache memory (without being purged) is used, for example, in a two-point reading operation performed in response to the following data transfer request. Yet, even in the random reading mode, the data buffered in the past is kept in the divided segments of the cache memory as long as possible so as to maximize the probability that requested data can be found in the cache memory in the future operations. On the other hand, in the case where it is determined that the type of a data request is a sequential data request, data is buffered in the cache memory using it as a single ring memory in such a manner as to efficiently use the capacity of the cache memory thereby increasing the cache-hit probability.

12 Claims, 16 Drawing Sheets

FIG. 4

| AREA #0 | #1 | #2 | #3 | #4 | #5 | #6 | #7 |
|---|---|---|---|---|---|---|---|
|  |  |  |  |  |  |  |  | rqLBA = 0   (REQUESTED START ADDRESS)
rqLG  = 0   (REQUESTED DATA LENGTH)

LBAm1 = 0
PLBAm1 = 0 (AREA #0)
VSN1 = 0
TSN1 = 0

LBAm2 = 0
PLBAm2 = 0 (AREA #0)
VSN2 = 0
TSN2 = 0

FIG. 5

| | SG1 | | | | SG2 | | | |
|---|---|---|---|---|---|---|---|---|
| AREA #0 | #1 | #2 | #3 | #4 | #5 | #6 | #7 |
| M | M+1 | M+2 | M+3 |  |  |  |  |

BEING BUFFERED (AREA #0 through #3)
BEING TRANSFERRED (AREA #0)

rqLBA = M
rqLG  = 2

LBAm1 = M
PLBAm1 = 0 (AREA #0)
VSN1 = 4
TSN1 = 0

LBAm2 = 0
PLBAm2 = 0 (AREA #0)
VSN2 = 0
TSN2 = 0 rqLBA = M
rqLG  = 1 rqLBA = N
rqLG  = 1

FIG. 22

| AREA #0 | #1 | #2 | #3 | #4 | #5 | #6 | #7 |
|---|---|---|---|---|---|---|---|
| M | M+1 | M+2 | M+3 | M+4 | | | |

$LBAm = M$
$PLBAm = 0$ (AREA #0)
$VSN = 5$
$TSN = 0$

FIG. 23

| AREA #0 | #1 | #2 | #3 | #4 | #5 | #6 | #7 |
|---|---|---|---|---|---|---|---|
| N | N+1 | N+2 | N+3 | N+4 | | | |

BEING BUFFERED (spans #3 – #4)
BEING TRANSFERRED (spans #0 – #2)

$rqLBA = N$
$rqLG = 3$ $LBAm = N$
$PLBAm = 0$ (AREA #0)
$VSN = 5$
$TSN = 0$

FIG. 24

| AREA #0 | #1 | #2 | #3 | #4 | #5 | #6 | #7 |
|---|---|---|---|---|---|---|---|
| N | N+1 | N+2 | N+3 | N+4 | N+5 | N+6 | N+7 |

BEING BUFFERED (#5 → #7)

$LBA_m = M$
$PLBA_m = 0$ (AREA #0)
$VSN = 5$
$TSN = 0$

FIG. 25

| AREA #0 | #1 | #2 | #3 | #4 | #5 | #6 | #7 |
|---|---|---|---|---|---|---|---|
| N+8 | N+9 | N+10 | N+3 | N+4 | N+5 | N+6 | N+7 |

BEING BUFFERED (#0 → #2)
BEING TRANSFERRED (#0)
RE-SERVE (#5)
CACHE-HIT (#6 → #7)
BEING TRANSFERRED (#6 → #7)

$rqLBA = N+6$
$rqLG = 3$ $LBA_m = N+6$
$PLBA_m = 6$ (AREA #6)
$VSN = 2$ ($VSN = 5$ WHEN BUFFERED TO N+10)
$TSN = 1$

REPRODUCING APPARATUS AND CACHING METHOD

BACKGROUND OF THE INVENTION

1. Field of the Invention

The present invention relates to a disk reproducing apparatus having the capability of reproducing data from a storage medium such as an optical disk, and more particularly to a caching process during a data reproducing operation.

2. Description of the Related Art

Optical disks serving as a storage medium such as a CD (compact disk) and a DVD (digital versatile disk/digital video disk) suitable for use in multimedia applications are known in the art.

In apparatus designed to reproduce data from these types of optical disks, a track on a disk is illuminated with a laser beam and data is read by detecting light reflected from the disk.

In a reproducing apparatus for reproducing data from a disk in response to a read command (data transfer request) issued by a host computer or the like and transferring the reproduced data to the host computer, the reproducing apparatus is required to rapidly transfer the data in response to the read command. In general, the read command includes in addition to read command itself, data representing the data start position and the data length from the data start position. That is, the host computer specifies particular sectors to be reproduced.

The operations performed by the reproducing apparatus in response to a read command basically include an operation of seeking an optical head to a particular point on a disk (an accessing operation) and an operation of reading specified data. The obtained data is transferred to the host computer. The reproducing apparatus includes a cache memory and the data is output via the cache memory.

After reading data from data sectors specified by the host computer, the reproducing apparatus first stores (buffers) the data into the cache memory and then transfers it from the cache memory to the host computer. In the above operation, the reproducing apparatus also reads data from the sector following the specified data sector and stores it into the cache memory. This operation is called a look-ahead reading operation.

When the reproducing apparatus receives another data request from the host computer after that, if the requested data is stored in the cache memory, the reproducing apparatus transfers the data from the cache memory to the host computer without having to obtain access to the disk. This allows a reduction in the effective access time.

In the case where data requests are successively issued by the host computer for successive sectors (such a type of data request is referred to as a sequential data request and the operation of reading such data is referred to as a sequential reading operation), the look-ahead reading into the cache memory is a very effective method to achieve rapid data transferring.

Buffering data into the cache memory is generally performed using the cache memory as a ring memory. That is, data with successive LBAs (logical block addresses, addresses of data sectors on a disk) is stored in the cache memory so as to reduce the access time during the sequential reading operation performed in response to a sequential data request.

The operation of buffering data into the cache memory is described in further detail below with reference to FIGS. 22–25.

For simplicity, the cache memory is assumed to have a size of 8 blocks (or 8 sectors each of which is assigned a particular LBA). The operation is described below by way of an example for a particular case in which the host computer issues a first data transfer request for 3 blocks (3 sectors) having LBAs of "N" to "N+2" and subsequently issues a second data transfer request for 3 blocks (3 sectors) having LBAs of "N+6" to "N+8".

Furthermore, it is assumed herein that before the first data transfer request was issued, data sectors having LBAs "M" to "M+4", were stored in an 8-block cache memory with areas #0-#7 as shown in FIG. 22. In the reproducing apparatus, the cache memory is controlled, as shown in FIG. 22, using internal parameters representing a start address LBAm, a pointer PLBAm, the number of valid sectors VSN, and the number of transferred sectors.

The start address LBAm refers to the LBA value of the start sector designated in the previous data request issued by the host computer. The start address LBAm has the minimum LBA value of the valid sectors stored in the cache memory.

The pointer PLBAm is a pointer pointing to the area of the cache memory in which the start address LBAm is stored.

The number of valid sectors VSN indicates how many successive data sectors starting at the start address LBAm are held in the cache memory.

The number of transferred sectors TSN indicates the number of data sectors which have already been transferred from the cache memory to the host computer.

In the specific example shown in FIG. 22, the start address LBAm=M, the pointer PLBAm=0, and the number of valid sectors VSN=5, and thus these parameters indicate that successive sectors having LBAs from "M" to "M+4" are stored in successively areas starting from area #0 as shown in the figure.

Herein, if the first data transfer request for 3 sectors having LBAs from "N" to "N+2" is issued, the following operation is performed as described below.

The data transfer request issued by the host computer includes a requested start address reLBA indicating the first address of the requested data sectors and also includes a requested data length rqLG indicating the number of sectors counted from the start address.

For example, when a data transfer request for 3 sectors having LBAs from "N" to "N+2", includes a requested start address reLBA=N and a requested data length rqLG=3.

When the above-described data transfer request is issued, data having LBAs "N" to "N+2" are not found (are not cache-hit) in the cache memory in the state shown in FIG. 22, and thus the cache memory is purged. That is, the entire data stored in the cache memory is made invalid and data having successive LBAs starting with "N" are buffered in the successive areas of the cache memory starting from the first area #0. The buffering operation is performed by accessing the disk to read data having successive LBAs starting from "N" and then storing the obtained data into the cache memory after performing the required decoding.

Although the data requested herein to be transferred are those having LBAS "N" to "N+2", a sector having an LBA "N+3" and the following sectors are also buffered in preparation for future data transfer requests for these sectors.

FIG. 23 illustrates the process of buffering data having LBA "N" and also data with LBAs following that into the purged cache memory. In a particular state shown in FIG. 23, data having LBAs "N" to "N+4" are kept in the cache memory in FIG. 23. The state of the cache memory is controlled by the parameters including the start address LBAm=N, the pointer PLBAm =0, and the number of valid sectors VSN=5.

After being buffered, the data having LBAS "N" to "N+2" are transferred to the host computer.

The operation of buffering the data into the cache memory is continued until a next data transfer request is issued or until the cache memory becomes full.

If the buffering is performed until the cache memory becomes full, the cache memory includes data having LBAs "N" to "N+7" as shown in FIG. 24.

After that, if a second data transfer request for 3 sectors having LBAs "N+6" to "N+8" is issued, that is, if a command including a requested LBA="N+6" and a requested data length rqLG=3 is issued, then an operation is performed as described below.

Of the three sectors requested to be transferred, two sectors having LBAs "N+6" and "N+7" are kept (cache-hit) in the cache memory as shown in FIG. 24, and thus these two sectors can be directly transferred from the cache memory to the host computer.

Thus, as shown in FIG. 25, the reproducing apparatus transfers the cache-hit data and reads data having a LBA "N+8" which is not held in the cache memory (by getting access to the disk).

In the above process, upon receipt of the second data transfer request for sectors having LBAs from "N+6" to "N+8", the parameters are updated such that the starting address LBAm=N+6, the pointer PLBAm=6, and the number of valid sectors VSN=2, and the stored data of LBAs "N" to "N+4" are made invalid. The data of the immediately previous sector with a LBA "N+5" is still held. The holding of the data of the immediately previous sector is achieved by setting the number of transferred sectors TSN to 1.

Thus, one block before the area #6 and two blocks after the area #6 in which the data of LBA "N+6" is stored are made valid.

The data of a LBA "N+8", which is also requested by the host computer to be transferred but which is not stored in the cache memory, is transferred after being buffered in the folded-back area (that is, area #0).

Data with an LBA "N+8" and data with LBAs following that are also buffered into the cache memory until the cache memory becomes full in preparation for future data transfer requests.

The number of valid sectors VSN is counted up when error correction is completed after reading and buffering data (that is, when certain sector data becomes valid after being buffered).

At the time when data having LBAs up to "N+10" have been buffered as shown in FIG. 25, the number of valid sectors VSN becomes 5.

By buffering data in the cache memory in the above-described manner, it is possible to increase the probability that data can be transferred in response to a sequential data transfer request without having to get access to the disk thereby reducing the average access time.

In practice, in addition to a sequential data request, other types of data transfer requests are also generated depending on the application executed on the host computer. The types of data transfer requests include a two-point reading request in which data sectors at two distant points on a disk are alternately requested and a random reading request in which data sectors at random locations on the disk is sequentially requested. There is a tendency that a reduction in the access time is also required for these data requests.

The problem of the above-described buffering technique is that the look-ahead reading into the cache memory is useless for the reduction in the access time for two-point reading requests or random reading requests because no data is buffered in the cache memory in the two-point reading or random reading mode.

SUMMARY OF THE INVENTION

In view of the above, an object of the present invention is to provide a technique of buffering data into a cache memory to achieve a reduction in the access time even in the two-point reading or random reading mode.

According to an aspect of the invention, there is provided a reproducing apparatus including reproduction control means which determines the request type of a given data request and which sets the mode (buffering mode) of storing data into cache memory means depending on the determined request type.

In the case where it is determined that the request type is not a sequential data request, the cache memory means is divided into a plurality of memory segments and data is stored in a particular memory segment so that the existing data buffered in the cache memory is further kept in the respective segments without being entirely purged even in a mode other than the sequential reading mode. This makes it possible that the data kept in the cache memory (without being purged) is used, for example, in a two-point reading operation performed in response to the following data transfer request.

On the other hand, if it is determined that the request type is a sequential data request, data is stored in the cache memory using it as a single ring memory.

BRIEF DESCRIPTION OF THE DRAWINGS

FIG. 4 is a schematic representation of a cache memory in an initial state according to an embodiment of the invention.

FIG. 5 is a schematic representation of a buffering process according to an embodiment of the invention.

FIG. 22 is a schematic representation of a buffering process according to a conventional technique.

FIG. 23 is a schematic representation of a buffering process according to the conventional technique.

FIG. 24 is a schematic representation of a buffering process according to the conventional technique.

FIG. 25 is a schematic representation of a buffering process according to the conventional technique.

DESCRIPTION OF THE PREFERRED EMBODIMENTS

The present invention is described in further detail below with reference to, by way of example, a reproducing apparatus for reproducing data from an optical disk.

Optical disks applicable to the reproducing apparatus include a CD disk such as a CD-DA (compact disk digital audio) or CD-ROM and a disk called a DVD (digital versatile disk/digital video disk). The present invention may also be applied to a disk reproducing apparatus designed to reproduce data from other types of optical disks.

Figure 1:
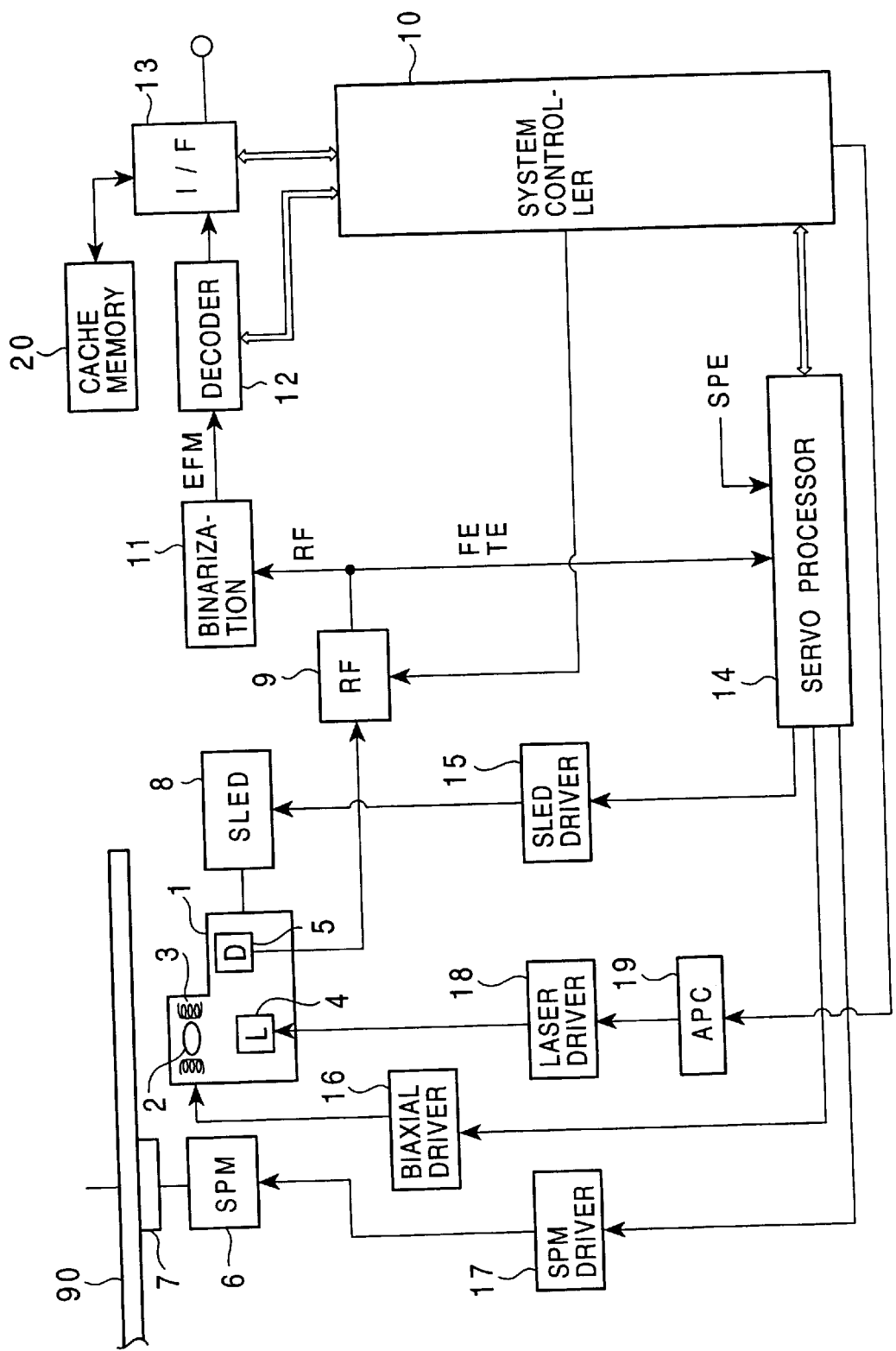
FIG. 1 is a block diagram illustrating an embodiment of a reproducing apparatus according to the present invention.

FIG. 1 is a block diagram illustrating the main parts of the reproducing apparatus according to an embodiment of the invention.

A disk 90 is placed on a turn table 7 and rotated at a constant linear velocity (CLV) or a constant angular velocity (CAV) by a spindle motor 1 during a reproducing operation.

The pickup 1 reads data recorded in the form of embossed pits or phase change pits on the disk 90.

The pickup 1 includes a laser diode 4 serving as a light source for emitting a laser beam, a photodetector 5 for detecting reflected light, an objective lens 2 serving as an output end through which the laser beam is output, and an optical system for illuminating the recording surface of the disk with the laser beam through the lens 2 and propagating the reflected light to the photodetector 5.

The objective lens 2 is supported by a biaxial actuator 3 in such a manner that the objective lens 2 can move in both the tracking direction and the focusing direction.

The pickup 1 as a whole can be moved by a sled mechanism 8 in a radial direction of the disk.

Information carried by light reflected from the disk 90 is detected by the photodetector 5 and converted to an electric signal corresponding to the amount of light. The resultant electric signal is supplied to an RF amplifier 9.

The RF amplifier 9 includes a current-voltage converter and a matrix operation/amplification circuit for generating signals corresponding to the output current of a plurality of photodetecting element of the photodetector 5. More specifically, the RF amplifier 9 generates an RF signal or reproduced data, a focus error signal FE used in a servo control operation, and a tracking error signal TE.

The reproduced RF signal output from the RF amplifier 9 is supplied to a binarization circuit 11, and the focus error signal FE and the tracking error signal TE are supplied to a servo processor 14.

The binarization circuit 11 converts the reproduced RF signal supplied from the RF amplifier 9 into a binary signal referred to as an EFM signal (8–14 modulation signal in the case of a CD) or into an EFM+signal (8–16 modulations signal in the case of a DVD). The output signal of the binarization circuit 11 is supplied to a decoder 12. The decoder 12 performs EFM-decoding and error correction, and furthermore CD-ROM-decoding and MPEG-decoding as required, so as to reproduce information recorded on the disk 90.

The decoder 12 accumulates the EFM-decoded data into a cache memory 20 serving as a data buffer and performs error correction on the data accumulated in the cache memory 20.

The corrected data stored in the cache memory 20 is referred to as buffered data, and the process of storing such data into the cache memory 20 is referred to as buffering. The buffering is a key process in the present embodiment of the invention, and it will be described in detail later.

The data buffered in the cache memory 20 is output and transferred as the output signal of the reproducing apparatus.

An interface 13 is connected to an external host computer so that reproduced data and a read command are transmitted to or from the host computer via the interface 13.

That is, the reproduced data stored in the cache memory 20 is output and transferred to the host computer via the interface 13, and the read command and other signals are supplied from the host computer to the system controller 10 via the interface 13.

The servo processor 14 generates various servo driving signals associated with the focus, tracking, sled, and spindle from the focus error signal F and the tracking error signal TE generated by the RF amplifier 9 and from the spindle error signal SPE generated by the decoder 12 or the system controller 10 thereby performing servo operations.

More specifically, the servo processor 14 generates a focus driving signal and a tracking driving signal in accordance with the focus error signal FE and the tracking error signal TE, and supplies the resultant signals to a biaxial driver 16. In accordance with these signals, the biaxial driver 16 drives the focus coil and the tracking coil of the axial mechanism 3 provided in the pickup 1. Thus, a tracking servo loop and a focus servo loop are formed by the pickup 1, the RF amplifier 9, the servo processor 14, the biaxial driver 16, and the biaxial mechanism 3.

The spindle driving signal generated by the servo processor 14 in accordance with the spindle error signal SPE is supplied to a spindle motor driver 17. In accordance with the spindle driving signal, the spindle motor driver 17 applies, for example, 3-phase driving signals to the spindle motor 6 thereby making the spindle motor 6 perform a CLV rotation. The servo processor 14 also generates a spindle driving signal in response to a spindle kick/brake control signal from the system controller 10 thereby starting or stopping the spindle motor 6 via the spindle motor driver 17.

Furthermore, in accordance with a sled error signal obtained as a low-frequency component of the tracking error signal TE and also in accordance with an access control signal generated by the system controller 10, the servo processor 14 generates a sled driving signal and supplies it to the sled driver 15. The sled driver 15 drives the sled mechanism 8 in accordance with the sled driving signal. Although not shown in the figure, the sled mechanism 8 includes a mechanism consisting of a main shaft for supporting the pickup 1, a sled motor, and a transmission gear whereby the pickup 1 is moved by means of a sliding operation performed by the sled motor 8 driven by the sled driver 15 in accordance with the sled driving signal.

The laser diode 4 of the pickup 1 is driven by the laser driver 18 so that a laser beam is emitted from the laser diode 4.

In the operation of reproducing data from the disk 90, the system controller 10 sets the target value of the laser power in an automatic power control circuit 19. The automatic power control circuit 19 controls the laser driver 18 so that the laser output power is controlled at the specified target value.

In the case where the apparatus also has the capability of recording data, a signal modulated in accordance with data to be recorded is applied to the laser driver 18.

More specifically, when data is recorded onto a disk 90 of the recordable type, data to be recorded is supplied from the host computer to an encoder (not shown) via the interface 13. The encoder (not shown) adds an error correction code and performs processes such as EFM+modulation on the data. The resultant data is supplied to the laser driver 18.

The laser driver 18 drives the laser diode 4 so that optical power corresponding to the data to be recorded is output from the laser diode 4 thereby recording the data onto the disk 90.

The above-described operations such as the servo control operation, decoding operation, and encoding operation are controlled by the system controller 10 including a microcomputer.

The reproducing operation is, for example performed as follows. On receipt of a read command from the host computer, the system controller 10 outputs a command to the servo processor 14 to seek the pickup 1 to a target point at which the first sector of the requested data starts. After completion of the seeking operation, the data sectors from the transfer data start position to the transfer data end position are all or partially read and the obtained data is subjected to required processes in the decoder 12 and the data buffer 20, as will be described in further detail later. After that, the reproduced data (requested data) from the transfer data start position to the transfer data end position is transferred to the host computer via the interface 13.

A read command, that is, a transfer request issued by the host computer includes a requested start address rqLBA indicating the first address of a requested data sectors and a requested data length rqLG indicating the number of sectors counted from the first address.

For example, when a transfer request includes a requested start address reLBA=A and a requested data length rqLG=3, 3 sectors having LBAs "N" to "N+2" are requested to be transferred.

The process of reading, buffering, and transferring data performed in the reproducing apparatus in response to a read command issued by the host computer is described below.

Upon receipt of a read command, the system controller 10 transfers the requested data to the host computer by reading data from the disk 90 decoding it, buffering the decoded data into the cache memory 20, and finally transferring it to the host computer. In the above process, data following the required data is also buffered depending on the status. In the above process, the system controller 10 determines the request type of a given data request and determines the data buffering mode depending on the request type.

More specifically, the system controller 10 determines whether the request type is a sequential reading request in which successive data sectors are requested to be sequentially transferred, a two-point reading request in which data recorded at two distant points on the disk 90 are requested to be alternately transferred, or a random reading request in which data recorded on absolutely random points are requested to be sequentially transferred.

Depending on the request type, the system controller 10 determines the data buffering mode in which data is buffered in the cache memory 20.

The buffering modes corresponding to various types of data requests are described first, and then specific examples of buffering processes for the respective types of data transfer requests are described with reference to FIG. 3 and other figures.

As described above, request types include a sequential reading request, a two-point reading request, and a random reading request.

In the case of a sequential reading request, the cache memory 20 is used as a single ring memory and the data requested to be transferred and look-ahead data following the requested data are buffered in the cache memory 20. The look-ahead buffering operation is continued until the cache memory 20 becomes full or until another data transfer request is issued thereby increasing the probability that data designated by another sequential reading request can be transferred from the cache memory.

In the case of a two-point reading request, the cache memory 20 is basically divided into two segments SG1 and SG2 and each is used as a segment buffer. More specifically, data at two points which will be probably requested are buffered in the respective segments thereby increasing the cache-hit probability in a reading operation in which data at two points on the disk 90 are alternately requested.

When the cache memory 20 is divided into two segments SG1 and SG2, it is not necessarily required that the division should be performed at a fixed point (although the cache memory 20 may be divided at a fixed point if desired), but the cache memory 20 is divided at a variable point depending on various parameters (LBAm1, PLBAm1, VSN1, TSN1, LBAm2, PLBAm2, VSN2, TSN2) which will be described later.

In the case of a random reading request, the cache memory 20 is divided so that a new segment is created therein each time a data transfer request is received. That is, when a data transfer request is generated, a new segment is created in the cache memory 20 while keeping the existing data buffered in the cache memory 20 (that is, the data which was buffered during the previous random reading operation) without discarding it, and the data required in the present random reading operation is buffered in the newly created segment. Although there is a limitation of keeping existing buffered data in the cache memory 20, as much data as possible is kept so as to maximize the probability that requested data can be found in the cache memory.

In order to select a proper buffering mode, when a data transfer request is issued by the host computer, the system controller 10 determines whether the data transfer request is a sequential reading request, a two-point reading request, or a random reading request.

Figure 2:
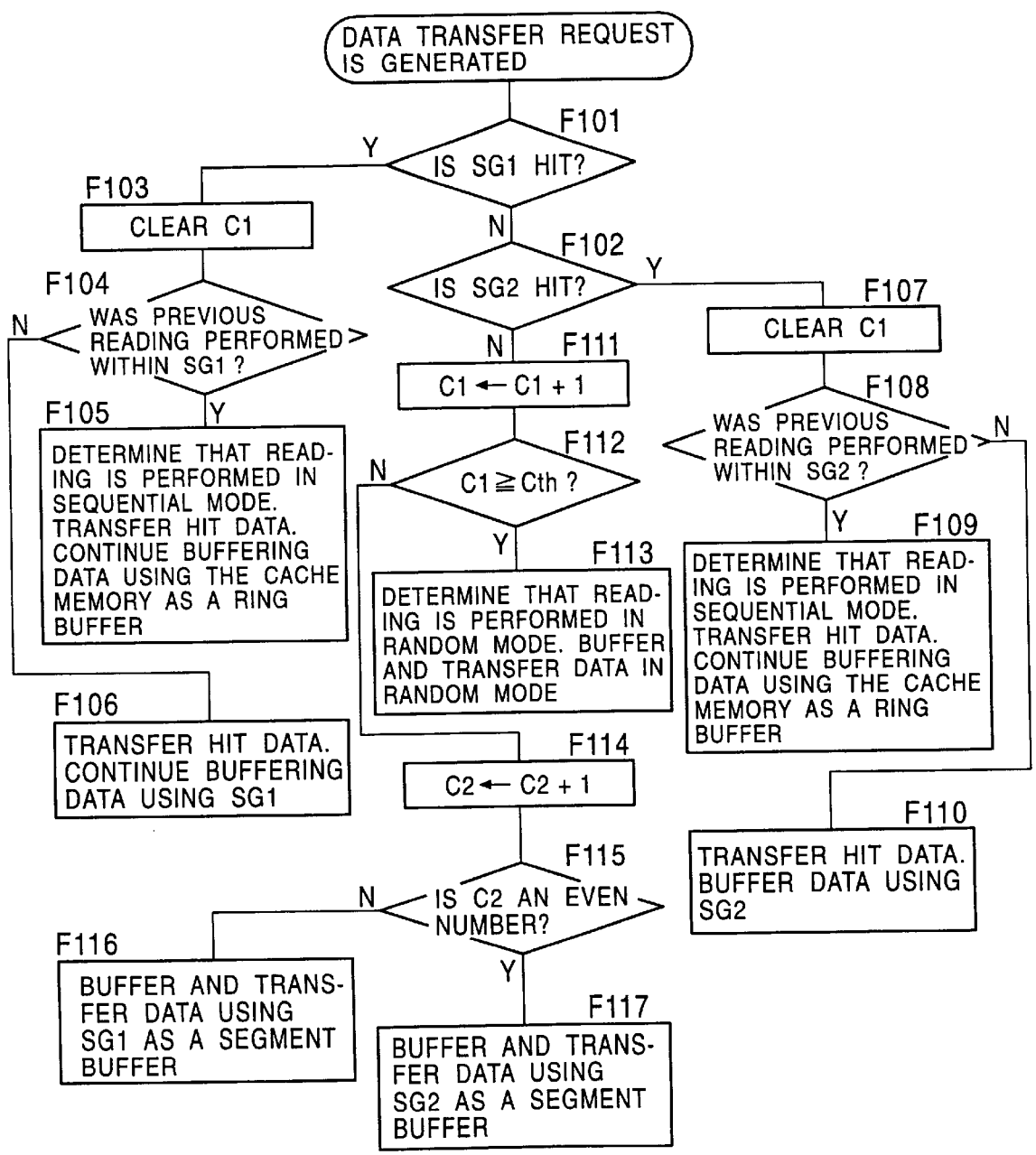
FIG. 2 is a flowchart illustrating a process of determining the reading mode in response to a given read command in accordance with an embodiment of the invention.

FIG. 2 is a flowchart illustrating the process of determining the type of the data request.

If a data transfer request is issued by the host computer when the cache memory 20 is in an initial state in which no data is buffered in the cache memory 20, there is no cache-hit data. In steps F101 and F102 shown in FIG. 2, it is determined whether the segments SG1 and SG2 of the cache memory 20 include hit data. In the initial state, the decision results of steps F101 and F102 are negative. In step F111, the value C1 of an internal counter is incremented.

The counter value C1 is used to determine whether the data transfer request is a random reading request or not. If it is determined in step F112 that the counter value C1 has not reached a particular value Cth, then the process goes to step F114.

In step F114, the counter value C2 of another internal counter is incremented. Depending on the counter value C2, it is determined whether data is buffered into the segment SG1 or SG2 of the cache memory.

More specifically, if it is determined in step F115 that the counter value C2 is, for example odd, then the process goes to step F116 in which data is buffered and transferred using the segment SG1 of the cache memory 20. On the other hand, if it is determined in step F115 that the counter value C2 is even, then the process goes to step F117 in which data is buffered and transferred using the segment SG2 of the cache memory 20.

That is, after a data transfer request is issued, if no cache-hit data is found and if it is not determined yet that the request type is a random reading request, then the cache memory 20 is divided into two segments SG1 and SG2 and these two segments are alternately used.

The buffering in step F116 or F117 is continued until the segment SG1 or SG2 becomes full or until a next data transfer request is issued. However, in the case where the process of transferring data designated in the next data transfer request is completed using only cache-hit data, buffering may be further continued.

When another data transfer request is issued after buffering data using the segments SG1 and SG2, the requested data may be found in the segment SG1 or SG2, that is, cache-hit data may be found in the segment SG1 or SG2.

If cache-hit data is found in the segment SG1, the process goes from step F101 to F103 and the counter value C1 is cleared.

In step F104, it is determined whether data associated with the previous data transfer request was transferred from the segment SG1 to the host computer.

If data was transferred from the segment SG1 in response to the previous data transfer request, it can be understood that sectors contiguous (or slightly apart within the range which can be covered by buffering) on the disk are requested in the present data transfer request issued by the host computer, and thus it can be concluded that the data transfer request issued by the host computer is a sequential reading request.

Thus, in this case, the process goes to step F105 and cache-hit data is transferred. If the requested data includes a sector which is not found in the cache memory, that sector is read, buffered, and transferred. Furthermore, it is determined that there is a high probability that the following data transfer request will also be a sequential reading request and sectors following the requested sectors are further buffered. In the above buffering process, the distinction between the segments SG1 and SG2 is removed and sectors are successively buffered, using the entire cache memory 20 as a ring memory, into areas starting with the area where the first data sector of the requested data is stored (in other words, the entire cache memory 20 is used as a segment SG1). In other words, data stored in the segment SG2 before that time is made invalid and the area in the segment SG2 is used in the present buffering process.

If the next data transfer request is also a sequential reading request, there is a high probability that the requested data can be found in the cache memory (in this case, the process goes to step F105 and data is further buffered into the cache memory 20 using as the single ring memory).

This look-ahead buffering is continued until the cache memory 20 becomes full or until a next data transfer request is issued. However, in the case where the process of transferring data designated in the next data transfer request is completed using only cache-hit data, buffering may be further continued.

In the case where the decision result in step F104 is negative, the given data transfer request is not a sequential reading request. In this case, the data hit in the segment SG1 can be regarded as the data which was buffered into the segment SG1 in response to the request which was issued before the previous data transfer request, and thus it can be determined that the data transfer request is a two-point reading request.

Thus, the process goes to step F106 and cache-hit data is transferred. If the requested data includes a sector which is not found in the cache memory, that sector is read, buffered, and transferred. Furthermore, it is determined that there is a high probability that the following data transfer request is also a two-point reading request and thus sectors following the requested sectors are further buffered. In the above buffering process, data is successively buffered in areas within the segment SG1 starting with the area where the first data sector of the requested data is stored, while keeping data in the segment SG2 valid, that is, keeping the distinction between the segments SG1 and SG2.

The above buffering process is continued until the segment SG1 becomes full or until a next data transfer request is issued. However, in the case where the process of transferring data designated in the next data transfer request is completed using only cache-hit data, buffering may be further continued.

In some cases, for example, when the segment SG2 includes invalid data, the boundary between the segments may be changed (for example such that the segment SG1 is expanded into the segment SG2).

When the given data transfer request can be regarded as a two-point reading request, there is a high probability that cache-hit data can be found in the other segment SG2 for the next data transfer request. Therefore, by keeping the data stored in the SG2 valid, it is possible to increase the probability that data can be transferred from the cache memory for the next data transfer request.

When a data transfer request is issued by the host computer, if cache-hit data is found in the segment SG2, then the process goes from step F102 to F107 and the counter value C1 is cleared.

Then in step F108, it is determined whether data associated with the previous data transfer request was transferred from the segment SG2 to the host computer.

If data was transferred from the segment SG2 in response to the previous data transfer request, it can be understood, as in step F104, that the data transfer request issued by the host computer is a sequential reading request. Thus, in this case, the process goes to step F109 and cache-hit data is transferred. If the requested data includes a sector which is not found in the cache memory, that sector is read, buffered, and transferred. Furthermore, it is determined that there is a high probability that the following data transfer request is also a sequential reading request, and sectors following the requested sectors are further buffered. In the above buffering process, the distinction between the segments SG1 and SG2 is removed and sectors are successively buffered, using the entire cache memory 20 as a ring memory, into areas starting with the area where the first data sector of the requested data is stored (in other words, the entire cache memory 20 is used as a segment SG1). In other words, data stored in the segment SG1 before that time is made invalid and the area in the segment SG1 is used in the present buffering process.

If the next data transfer request is also a sequential reading request, there is a high probability that the requested data can be transferred from the cache memory (in this case, the process goes to step F109 and data is further buffered into the cache memory 20 using it as a single ring memory).

This look-ahead buffering is continued until the cache memory 20 becomes full-or until a next data transfer request is issued. However, in the case where the process of transferring data designated in the next data transfer request is completed using only cache-hit data, buffering may be further continued.

In the case where the decision-result in step F108 is negative, the given data transfer request is not a sequential reading request. In this case, the data hit in the segment SG2 can be regarded as the data which was buffered into the segment SG2 in response to the request which was issued before the previous data transfer request, and thus it can be determined that the data transfer request is a two-point reading request.

Thus, the process goes to step F110 and cache-hit data is transferred. If the requested data includes a sector which is not found in the cache memory, that sector is read, buffered, and transferred. Furthermore, it is determined that there is a high probability that the following data transfer request is also a two-point reading request or a sequential reading request, and thus sectors following the requested sectors are further buffered. In the above buffering process, data is successively buffered in areas within the segment SG2 starting with the area where the first data sector of the requested data is stored, while keeping the data in the segment SG1 valid, that is, keeping the distinction between the segments SG1 and SG2.

This look-ahead buffering is continued until the cache memory 20 becomes full or until a next data transfer request is issued. However, in the case where the process of transferring data designated in the next data transfer request is completed using only cache-hit data, buffering may be further continued.

In some cases, for example when the segment SG1 includes invalid data, the boundary between the segments may be changed (for example such that the segment SG2 is expanded into the segment SG1).

When the given data transfer request can be regarded as a two-point reading request, there is a high probability that cache-hit data can be found in the other segment SG1 for the next data transfer request. Therefore, the data stored in the SG1 is kept valid so as to increase the probability that data can be transferred from the cache memory for the next data transfer request.

If no cache-hit data is found for a plurality of successive requests, the counter value C1 is incremented in step F111 each time such a data transfer request occurs whereas the counter value C1 is not cleared in steps F103 or F107. As a result, it is eventually determined in step F112 that the counter value C1 has reached the particular value Cth.

In this case, it can be understood that data located at different points on the disk are requested by the successive requests to transfer data, and thus it can be determined that the data transfer request is a random reading request. In this case, although buffering was performed alternately using the segments SG1 and SG2, no cache-hit was found and thus the buffering into the two segments was not useful because the type of the data transfer request was not a two-point reading request.

When the data transfer request is regarded as a random reading request, the process goes to step F113 and buffering is performed in the random reading mode.

Although not described in detail in FIG. 2, buffering in the random reading mode is performed as follows. At the first time that the data transfer request was determined as a random reading request (that is, when the process goes to step F113 after the counter value C1 became equal to Cth), the data buffered in the segments SG1 and SG2 or buffered in the ring memory mode is entirely purged.

After that, data associated with the data transfer request is buffered into the cache memory starting from the first area.

The buffering is continued until a next data transfer request is issued or until look-ahead buffering is complete for a predetermined amount of data.

When a next data transfer request is issued, if no cache-hit data is found, then it is determined that the data is still requested in the random reading mode and the process goes to step F113 (this is the case where the process goes to step F113 after the counter value C1 became greater than Cth). At the second or the following time that it is successively determined that data is requested in the random reading mode, the data held in the cache memory 20 is not purged but a new segment is created in the cache memory 20 and the data associated with the present data transfer request is buffered in the newly created segment. This buffering process is also continued until a next data request is issued or until look-ahead buffering is complete for a predetermined amount of data.

That is, when random reading is successively performed, data associated with the present data transfer request is buffered while keeping each data buffered during previous random reading processes in one segment. As a result, the number of segments increases each time another data transfer request in the random reading mode is successively generated of course, there is an upper limit on the number of segments created in the cache memory depending on the capacity of the cache memory 20 and the amount of data buffered therein. If the cache memory 20 has been divided into the maximum allowable number of segments after a large number of random reading operations, the oldest segment is made invalid so that data can be buffered therein in a next random reading operation.

As described above, even in the random reading mode, as much buffered data as possible is kept valid thereby ensuring that there is still a possibility that cache-hit data can be found in the cache memory in the following processes.

For example, if hit data is found in a certain segment during a later process performed in response to a data transfer request, a segment SG1 is set with respect to the hit data (for example, the segment in which the hit data is found is expanded to create a segment SG1, and data is buffered in the expanded portion whereas a segment SG2 is created by the remaining portion) so that the cache memory can be used in an efficient fashion in the following two-point reading process or sequential reading process in steps F101–F106. This buffering technique makes it possible to increase the probability that cache-hit data can be found during the following two-point reading operation or sequential reading operation.

In the present invention, as described above, the mode of buffering data in the cache memory 20 is selected depending on the type of a data transfer request. Now, specific examples of operations are described below.

Figure 3:
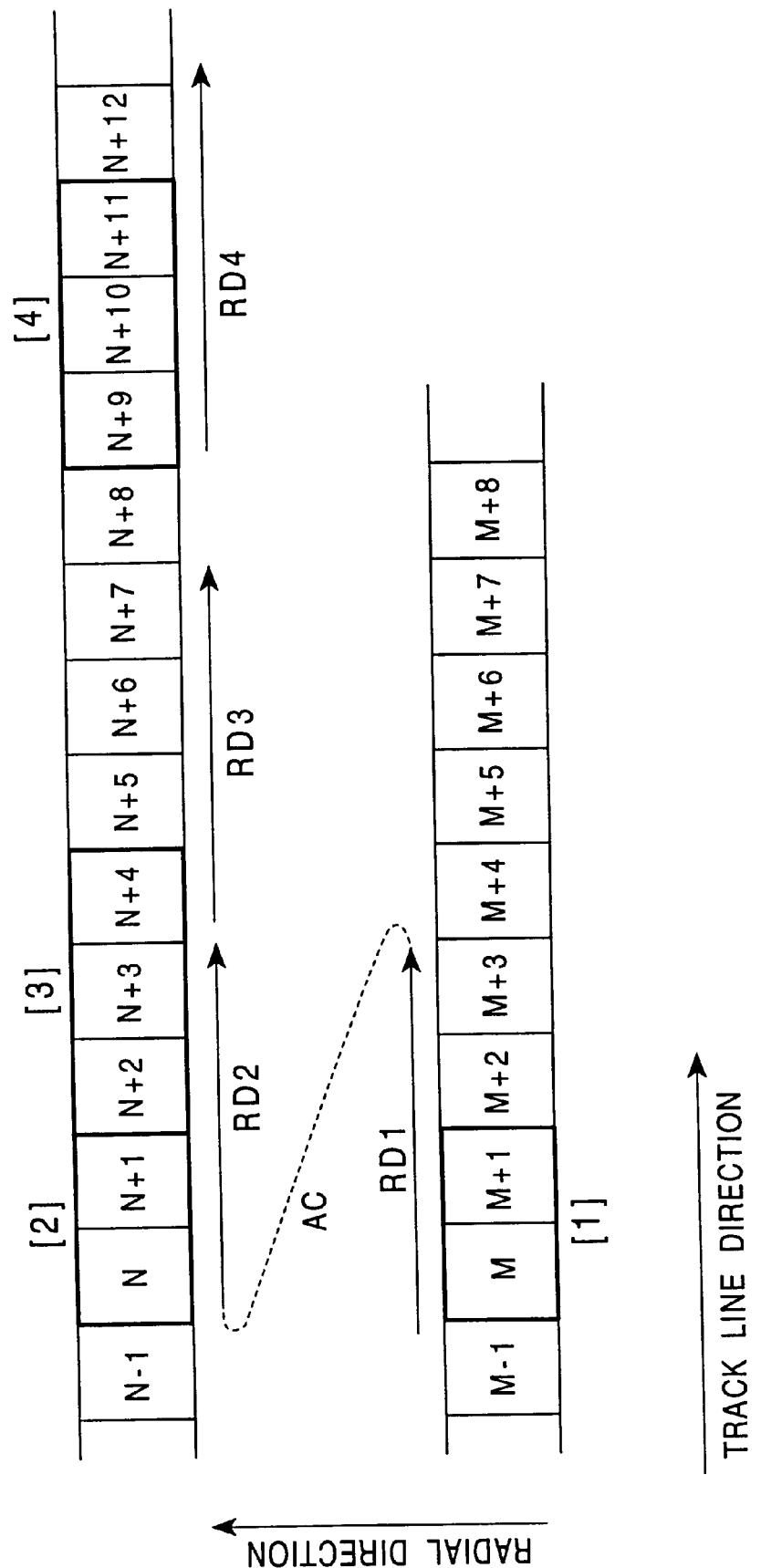
FIG. 3 is a schematic diagram illustrating an example of a reading process according to an embodiment of the invention.

FIG. 3 partially illustrates data sectors on the disk 90. Referring to FIG. 3, the operation is described below for a specific case where data transfer requests are successively generated for sectors denoted by [1]–[4] in the figure.

That is, it is assumed herein that the following data transfer requests are issued by the host computer.

[1] A data transfer request for two sectors designated by a requested start address reLBA=M and a requested data length rqLG=2 is issued. That is, sectors with LBAs "M" and "M+1" are requested.

[2] A data transfer request for two sectors designated by a requested start address reLBA=N and a requested data length rqLG=2 is issued. That is, sectors with LBAs "N" and "N+1" are requested.

[3] A data transfer request for three sectors designated by a requested start address reLBA=N+2 and a requested data length rqLG=3 is issued. That is, sectors with LBAs "N+2", "N+3", and "N+4" are requested.

[4] A data transfer request for three sectors designated by a requested start address reLBA=N+9 and a requested data length rqLG=3 is issued. That is, sectors with LBAs "N+9", "N+10", and "N+11" are requested.

Although not shown in FIG. 3, the operation is also described below for the case where after the data transfer request [4], another data transfer request [5] is generated in which three sectors designated by a requested start address rqLBA=M and a requested data length rqLG=3, that is, three sectors with LBAs "M", "M+1", and "M+2" are requested.

FIG. 4 illustrates an initial state of the cache memory 20 after the electric power of the reproducing apparatus is turned on or the reproducing apparatus is soft-reset or hard-reset.

For ease of description, it is assumed here that the cache memory 20 has a capacity of 8 blocks (sectors) or areas #0–#7.

The state of the cache memory 20 is controlled by internal parameters including a starting address LBAm, a pointer PLBAm, the number of valid sectors VSN, and the number of transferred sectors TSN wherein these parameters are set depending on generated segments.

The segment SG1 is controlled by parameters including a starting address LBAm1, a pointer PLBAm2, the number of valid sectors VSN1, and the number of transferred sectors TSN1, and the segment SG2 is controlled by parameters including a starting address LBAm2, a pointer PLBAm2, the number of valid sectors VSN2, and the number of transferred sectors TSN2.

When the cache memory is divided into three or more segments during a random reading operation, the respective segments are controlled by their own parameters including a start address LBAm(x), a pointer PLBAm(x), the number of valid sectors VSN(x), and the number of transferred sectors TSN(x).

In the case where a sequential reading operation is performed without dividing the cache memory into segments, the status of the cache memory is controlled by parameters including a start address LBAm1=LBAm2, a pointer PLBAm1=PLBAm2, the number of valid sectors VSN1=VSN2, and the number of transferred sectors TSN1=TSN2.

The start addresses LBAm1 and LBAm2 are set to the values of the start sector addresses which were requested by the host computer in the previous data transfer request wherein the start addresses indicate the smallest LBAs of the valid sectors stored in the respective segments.

The pointers PLBAm1 and PLBAm2 point to the respective areas where the start addresses LBAm1 and LBAm2 are stored.

The numbers of valid sectors VSN1 and VSN2 indicate the numbers of successive data sectors counted from the start addresses LBAm1 and LBAm2, respectively, which are stored in the respective segments.

The numbers of transferred sectors TSN1 and TSN2 indicate the numbers of sectors which have been transferred from the respective segments to the host computer.

In the initial state shown in FIG. 4, there is no valid data in the cache memory 20, of course. The respective parameters, the start address LBAm1, the pointer PLBAm1, the number of valid sectors VSN1, the number of transferred sectors TSN1, the start address LBAm2, the pointer PLBAm2, the number of valid sectors VSN2, and the number of transferred sectors TSN2, are all set to their initial values.

If a data transfer request for data designated by a requested start address rqLBA =M and a requested data length rqLG=2 is issued as described above in [1], an operation is performed as described below.

In this case, of course, no cache-hit data is found for the requested data with a LBA "M" or "M+1", and thus the process goes to step F115 shown in FIG. 2. In this case, the counter value C2=1, and thus it is determined in step F116 that the counter value C2 is odd. As a result, the process goes to step F116.

In step F116, a segment SG1 is set in such a manner as to include areas #0–#3 and data is buffered into this segment SG1.

The state of the cache memory at this stage is shown in FIG. 5. As shown in FIG. 5, not only sectors with LBAs "M" and "M+1" are buffered but also the following sectors are buffered until the segment SG1 becomes full. In this specific example, the segment SG1 becomes full when a sector with a LBA "M+3" is buffered. The above process corresponds to a reading operation RD2 on the disk 90 shown in FIG. 3.

In this case, the state of the cache memory is controlled by the parameters: the start address LBAm2=M; the pointer PLBAm1=0; the number of valid sectors VSN1=4; and the number of transferred sectors TSN1=0.

In the example shown in FIG. 5, data is buffered for LBAs "M" to "M+3" . However, in the case where another data transfer request is issued before the segment SG1 becomes full with buffered data, the buffering operation is terminated.

Of the buffered data, the requested data with the LBA "M" and "M+1" are transferred to the host computer.

After that, if a data transfer request for data designated by a requested start address rqLBA=N and a requested data length rqLG=2 is issued as described above in [2], an operation is performed as described below.

In this case, as can be understood from the state of the cache memory shown in FIG. 5, no cache-hit data is found for either LBA "N" or "N+1", and thus the process goes to step F115 shown in FIG. 2. In this case, the counter value C2 =2, and thus it is determined in step F115 that the counter value C2 is even. As a result, the process goes to step F117.

Figure 6:
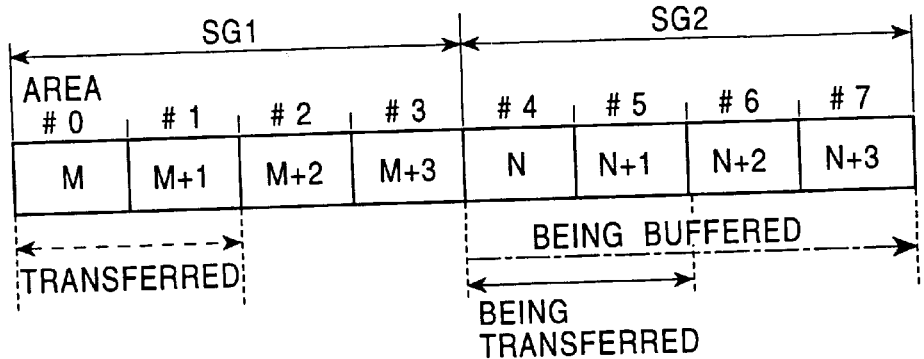
FIG. 6 is a schematic representation of a buffering process according to an embodiment of the invention.

In step F117, data is buffered into the segment SG2 including areas #4–#7. The state of the cache memory at this stage is shown in FIG. 6. As shown in FIG. 6, data is buffered not only for the requested sectors with LBAs "N" and "N+1" but also for the following sectors until the segment SG2 becomes full. In this specific example, the segment SG2 becomes full when a sector with a LBA "N+3" is buffered. The above process corresponds to an accessing operation AC and a reading operation RD2 on the disk 90 shown in FIG. 3.

In this case, the state of the segment SG2 is controlled by the parameters: the start address LBAm2=N; the pointer PLBAm2=4; the number of valid sectors VSN2=4; and the number of transferred sectors TSN2=0.

If another data transfer request is issued before the segment SG2 becomes full with buffered data, the buffering operation is terminated.

Of the buffered data, the requested data with the LBA "N" and "N+1" are transferred to the host computer.

Furthermore, if a data transfer request for data designated by a requested start address rqLBA=N+2 and a requested data length rqLG=3 is issued as described above in [3], an operation is performed as described below.

In this case, as can be seen from the state of the cache memory shown in FIG. 6, cache-hit data is found in the segment SG2 for data with LBAS "N+2" and "N+3" of the requested data.

Furthermore, because data was transferred from the segment SG2 in the previous data transfer operation, the process goes to step F109 in which it is determined that the data transfer request is a sequential reading request.

Figure 7:
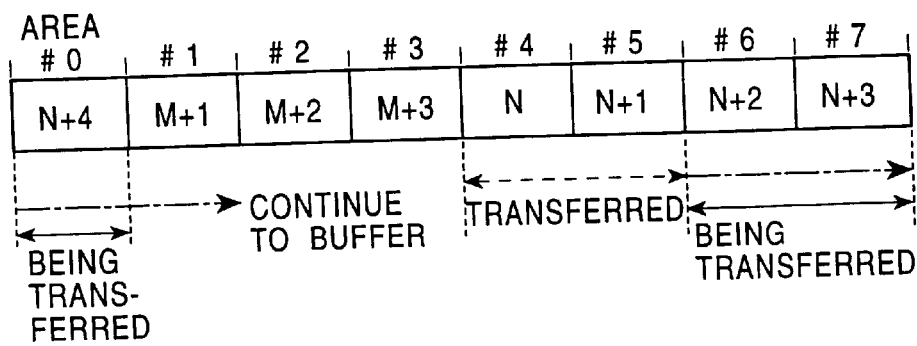
FIG. 7 is a schematic representation of a buffering process according to the embodiment of the invention.

Thus, as shown in FIG. 7, the cache-hit data for LBAs "N+2" and "N+3" are transferred and data with LBA "N+4" which has not been read yet is read from the disk 90 and buffered. In this case, the segment SG1 is made invalid and the cache memory 20 is used as a single ring memory. The data with the LBA "N+4" is buffered in the area #0. After being buffered, the data with the LBA "N+4" is transferred to the host computer.

In this case, the state of the cache memory is controlled by the parameters: the start address LBAm2=N+2; the pointer PLBAm2=6; the number of valid sectors VSN2=3; and the number of transferred sectors TSN2=2. The segment SG1 is made invalid and the parameters associated with the segment SG1, that is, the start address LBAm1, the pointer PLBAm1, the number of valid sectors VSN1, and the number of transferred sectors TSN1 are made equal to the corresponding parameters associated with the segment SG2.

Data with a LBA "N+4" and data with LBAs following that are also buffered in preparation for a sequential reading operation expected to be performed. The above process corresponds to a reading operation RD3 on the disk 90 shown in FIG. 3.

Figure 8:
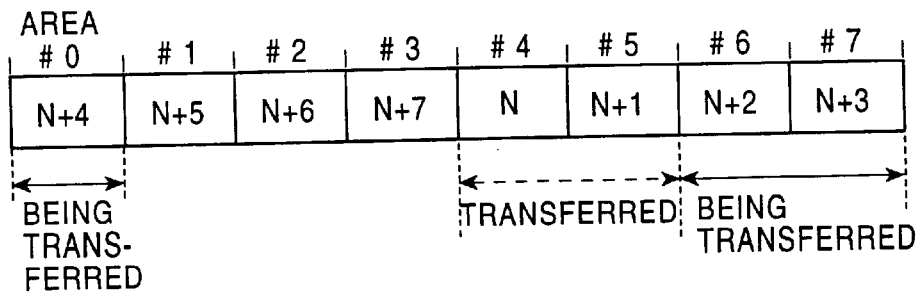
FIG. 8 is a schematic representation of a buffering process according to the embodiment of the invention.

In the above-described buffering process, data with LBAs up to for example "N+7" is buffered as shown in FIG. 8. The number of valid sectors VSN is updated each time data is buffered, and the number of valid sectors VSN2 becomes 6 in the state shown in FIG. 8.

After that, if a data transfer request for data designated by a requested start address rqLBA=N+9 and a requested data length rqLG=3 is issued as described above in [4], an operation is performed as described below.

In this case, as can be seen from the state of the cache memory shown in FIG. 8, no cache-hit data is found for any of LBAs "N+9", "N+10", or "N+11", and it is determined that the data transfer request is not a sequential reading request. In this case, the process goes to step F116 shown in FIG. 2.

In step F116, the data held in the cache memory is partially purged so as to reset the segment SG1 including areas #0–#3, and then data is buffered into the segment SG1.

The state of the cache memory at this stage is shown in FIG. 6. Data is buffered not only for the requested sectors with LBAs "N+9", "N+10", and "N+11" but also for the following sectors until the segment SG1 becomes full. In this specific example, the segment SG1 becomes full when a sector with an LBA "N+12" is buffered. The above process corresponds to a reading operation RD4 on the disk 90 shown in FIG. 3.

In this case, the state of the segment SG1 is controlled by the parameters: the start address LBAm1=N+9; the pointer PLBAm1=0; the number of valid sectors VSN1=4; and the number of transferred sectors TSN1=0. Furthermore, the state of the segment SG2 is controlled by the parameters: the start address LBAm2=N+2; the pointer PLBAm2=6; the number of valid sectors VSN2=2; and the number of transferred sectors TSN2=2.

Figure 9:
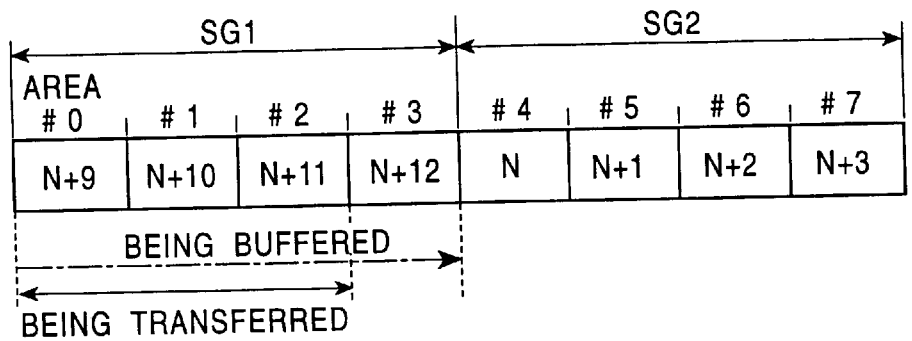
FIG. 9 is a schematic representation of a buffering process according to the embodiment of the invention.

Of the buffered data, the requested data with LBAs "N+9", "N+10", and "N+11" are transferred to the host computer as shown in FIG. 9.

Although not shown in FIG. 3, if a data transfer request for data designated by a requested start address rqLBA=M and a requested data length rqLG=3 is further issued as described above in [5], an operation is performed as described below.

In this case, as can be understood from the state of the cache memory shown in FIG. 9, no cache-hit data is found for any of LBAs "M", "M+1", and "M+2", and thus the process goes to step F117 shown in FIG. 2.

Figure 10:
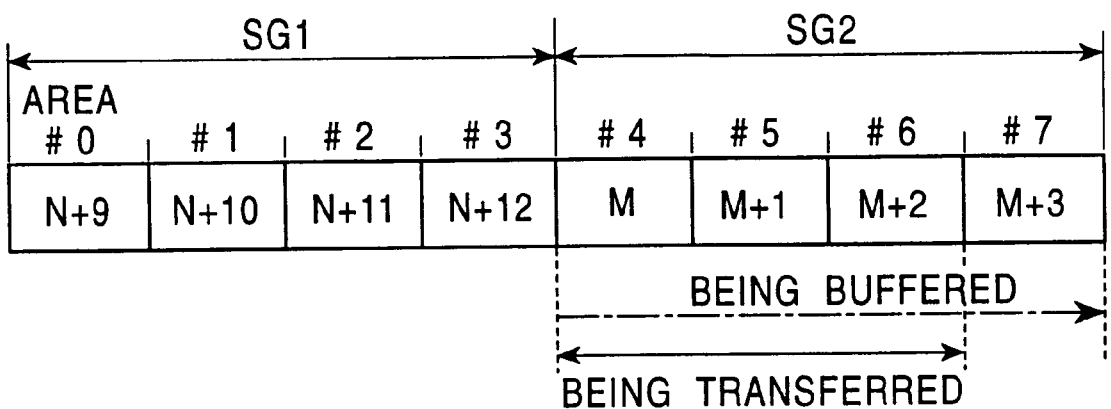
FIG. 10 is a schematic representation of a buffering process according to the embodiment of the invention.

In step F117, data is buffered in the areas #4–#7 of the segment SG2. The state of the cache memory at this stage is shown in FIG. 10. Data is buffered not only for the requested sectors with LBAs "M", "M+1", and "M+2" but also for the following sectors until the segment SG2 becomes full. In this specific example, the segment SG2 becomes full when an sector with a LBA "M+3" is buffered.

In this case, the state of the segment SG2 is controlled by the parameters: the start address LBAm2=M; the pointer PLBAm2=4; the number of valid sectors VSN2=4; and the number of transferred sectors TSN2=0.

Of the buffered data, the requested data with LBAs "M", "M+1", and "M+2" are transferred to the host computer.

In the present embodiment, in response to sequentially generated data transfer requests, the mode of buffering data into the cache memory 20 is changed depending on the type of received data transfer requests as described above so as to increase the cache-hit transfer probability.

A specific example is described below in which the operation is performed in the most effective fashion according to one embodiment of the present invention.

Figure 11:
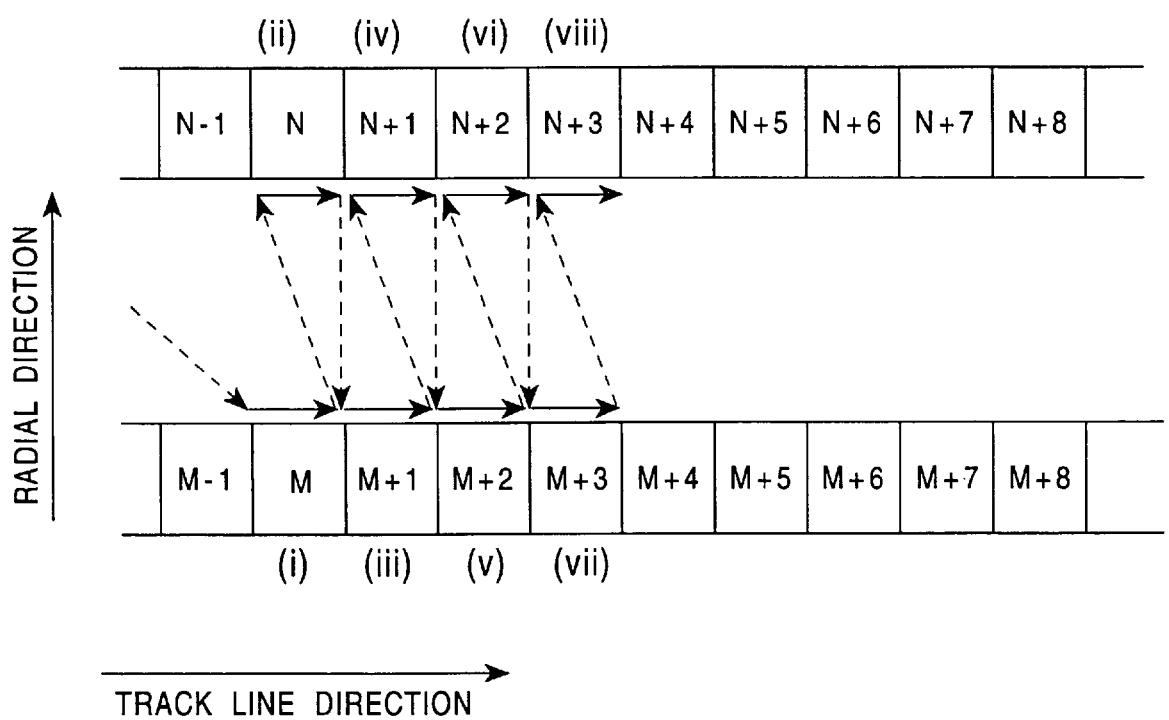
FIG. 11 is a schematic representation of an example of an inefficient reading operation in a two-point reading mode.

Assume that eight data transfer requests are generated which cause the reproducing apparatus to perform a two-point reading operation in which sectors at two different points are alternately read as represented by (i)–(viii) in FIG. 11.

FIG. 11 presents, for the purpose of comparison with the present embodiment, an illustration of the operation of accessing data on the disk 90 according to the conventional buffering technique (described earlier with reference to FIGS. 22–25).

In the conventional technique, if no cache-hit data is found, the cache memory is purged each time a data transfer request is generated. Therefore, there is absolutely no possibility that data is transferred from the cache memory during a two-point reading operation such as that denoted by (i)–(viii). As a result, it is required to perform accessing operations denoted by broken lines in FIG. 11 and also reading operations denoted by solid lines in FIG. 11 in response to the respective data transfer requests. This means that the look-ahead reading operation has no contribution to the reduction in the access time.

Figure 12:
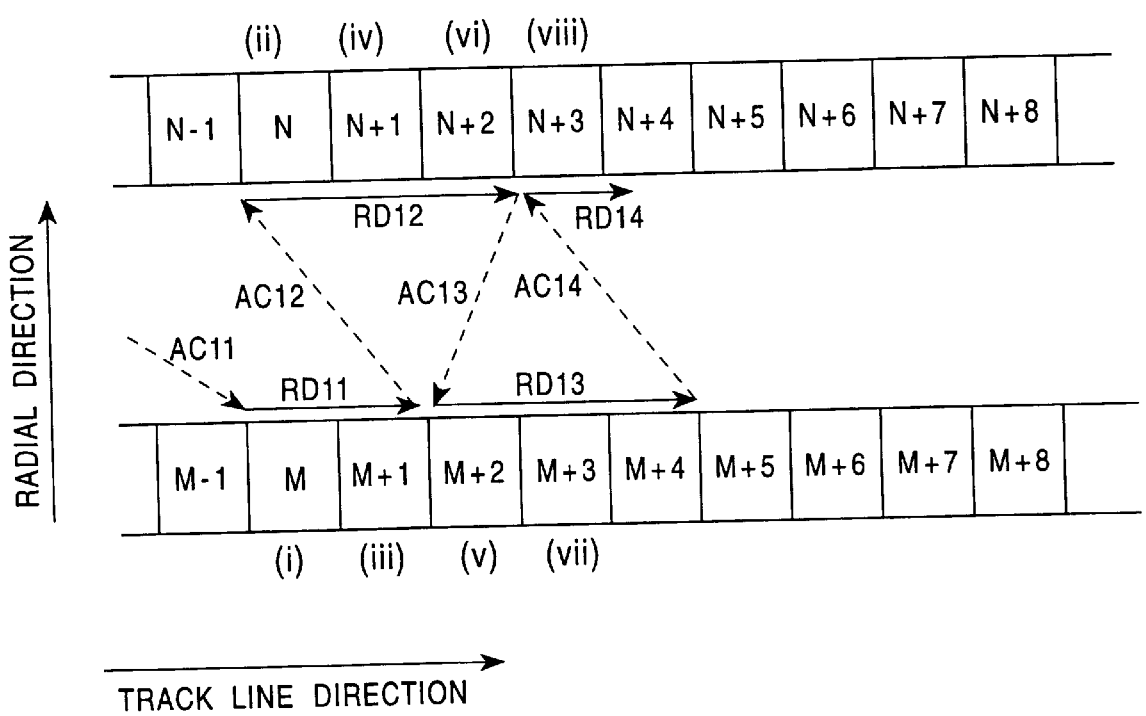
FIG. 12 is a schematic representation of a two-point reading process according to an embodiment of the invention.

In contrast, the present embodiment of the invention performs a two-point reading operation such as that denoted by (i)–(viii) in a highly efficient fashion as shown in FIG. 12. That is, the present embodiment requires only reading operations denoted by RD11–RD14 in FIG. 12 and accessing operations denoted by AC11–AC14 in which the accessing operations are performed in a very efficient fashion compared with the accessing operations shown in FIG. 11.

The buffering operation required to achieve a highly efficient accessing operation such as that shown in FIG. 12 is described below with reference to FIGS. 13–20.

Figure 13:
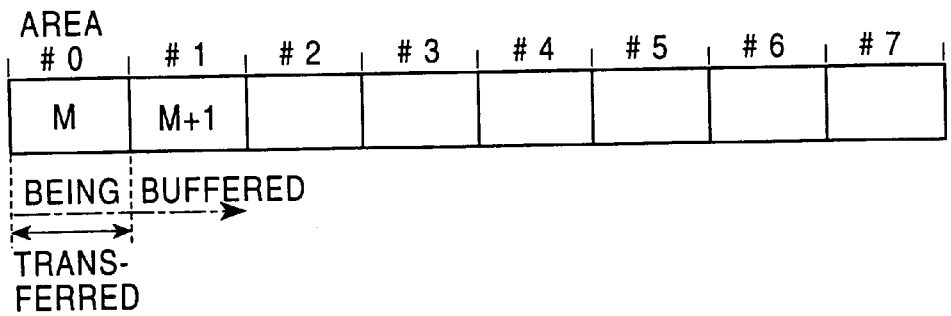
FIG. 13 is a schematic representation of a buffering process during a two-point reading operation according to an embodiment of the invention.

When the cache memory is in the initial state shown in FIG. 4, if a data transfer request for data designated by a requested start address rqLBA=M and a requested data length rqLG=1 is issued as denoted by (i) in the figure, an operation is performed as described below. In this case, of course, no cache-hit data is found, and thus the process goes to step F116 shown in FIG. 2. In step F116, a segment SG1 is set in such a manner as to include areas #0–#3 and data is buffered into this segment SG1. More specifically, data with a LBA "M", and data with LBAs following that are buffered into the segment SG1 as shown in FIG. 13. The above process corresponds to an accessing operation AC11 and a reading operation RD11 on the disk 90 shown in FIG. 12.

Of the buffered data, the requested data with the LBA "M" is transferred to the host computer.

After the buffering is complete for data with LBAs up to "M+1", if a next data transfer request for data designated by a requested start address rqLBA=N and a requested data length rqLG=1 is issued as denoted by (ii) in FIG. 12, an operation is performed as described below.

In this case, as can be seen from the state of the cache memory shown in FIG. 13, no cache-hit data is found for the requested LBA "IN", and thus the process goes to step F117 shown in FIG. 2. That is, as shown in FIG. 4, no further data is buffered in the segment SG1, but data with an LBA "N" and data with LBAs following that are buffered into the areas #4–#7 of the segment SG2. Of the buffered data, the requested data with the LBA "N" is transferred to the host computer.

Figure 14:
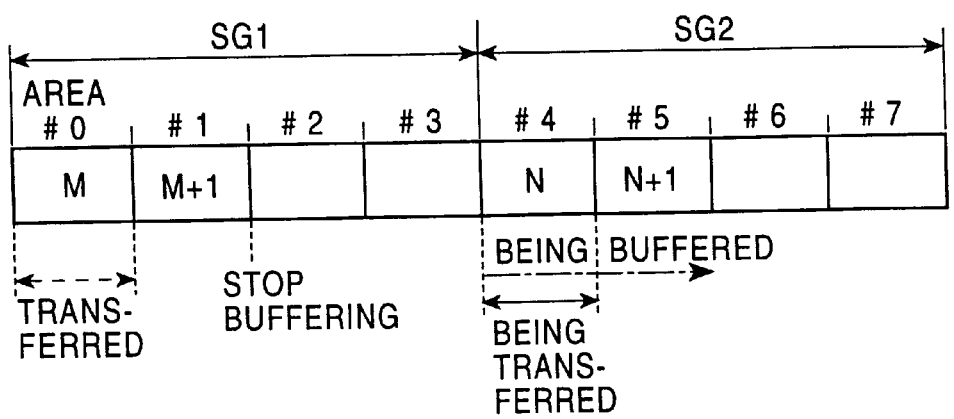
FIG. 14 is a schematic representation of a buffering process during the two-point reading operation according to the embodiment of the invention.

When data with LBAs up to "N+1" have been buffered into the segment SG1 as shown in FIG. 14, if a next data transfer request for data designated by a requested start address rqLBA=M+1 and a requested data length rqLG=1 is issued as denoted by (iii) in FIG. 12, an operation is performed as described below.

In this case, the requested data with the LBA "M+1" is found in the segment SG1 of the cache memory.

Figure 15:
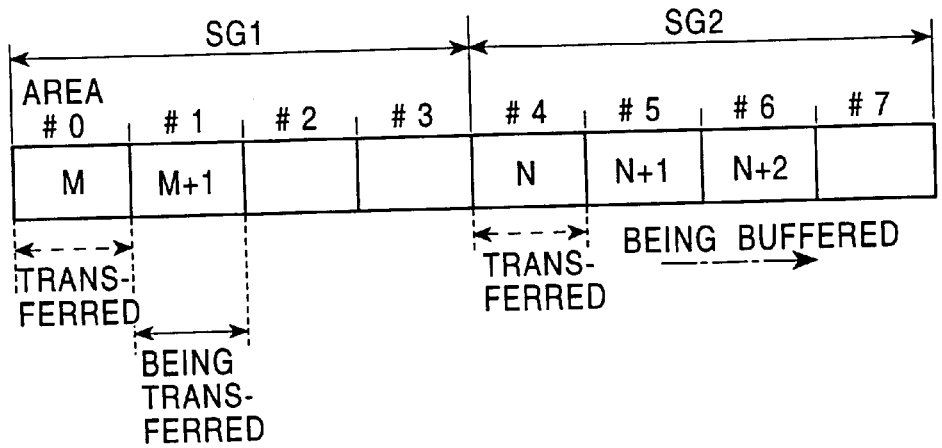
FIG. 15 is a schematic representation of a buffering process during the two-point reading operation according to the embodiment of the invention.

Therefore, the process goes to step F106 and the cache-hit data with the LBA "M+1" is transferred as shown in FIG. 15.

In this case, although not described in detail in the flowchart shown in FIG. 2, the transferring operation is completed by transferring only the cache-hit data and thus the buffering operation which was started in response to the data transfer request (ii) described above is further continued without being terminated. In the flowchart shown in FIG. 2, the buffering operation is continued in the immediately previous step F117 and only the process of transferring the cache-hit data is performed in the present step F106.

Thus, as shown in FIG. 15, data with a LBA "N+2" and data with LBAs following that are further buffered into the segment SG2 after completion of the transfer of the cache-hit data with the LBA "M+1".

After that, if a data transfer request for data designated by a requested start address rqLBA=N+1 and a requested data length rqLG=1 is issued as denoted by (iv) in FIG. 12, an operation is performed as described below. In this case, the requested data with the LBA "N+1" is found in the segment SG2 of the cache memory.

Figure 16:
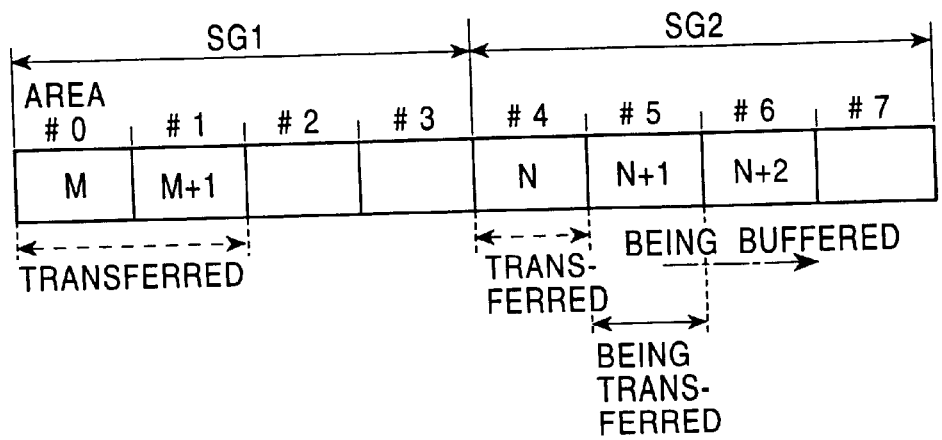
FIG. 16 is a schematic representation of a buffering process during the two-point reading operation according to the embodiment of the invention.

Thus, in step F110 shown in FIG. 2, the cache-hit data with the LBA "N+1" is transferred as shown in FIG. 16. Also in this case, the data transfer is completed by transferring only the hit-cache data and thus the buffering operation started in response to the data transfer request (ii) is further continued without being terminated.

When data with LBAs up to "N+2" have been buffered into the segment SG2, if a data transfer request for data designated by a requested start address rqLBA=M+2 and a requested data length rqLG=1 is issued as denoted by (iv) in FIG. 12, an operation is performed as described below.

In this case, the requested data with the LBA "M+2" is not found in the cache memory.

Figure 17:
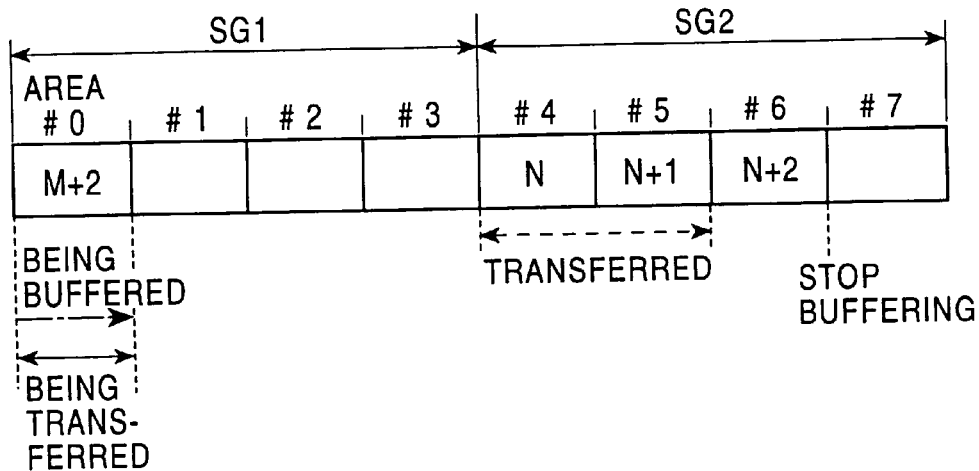
FIG. 17 is a schematic representation of a buffering process during the two-point reading operation according to the embodiment of the invention.

As a result, the process goes to step F116 in which the operation of buffering data into the segment SG2 is stopped and data with an LBA "M+2" and data with LBAs following that are buffered into the SG1 as shown in FIG. 17.

In the operation on the disk 90, the buffering that started when the reading operation RD12 shown in FIG. 12 was performed is stopped, and the buffering into the segment SG1 is started when the accessing operation AC13 and the reading operation RD13 are performed.

Of the buffered data, the requested data with the LBA "M+2" is transferred to the host computer.

When the operation of buffering data into the segment SG1 is in progress, if, as shown in FIG. 17, another data transfer request for data designated by a requested start address rqLBA=N+2 and a requested data length rqLG=1 is issued as denoted by (vi) in FIG. 12, then an operation is performed as described below.

In this case, the requested data with the LBA "N+2" is found in the segment SG2 of the cache memory.

Figure 18:
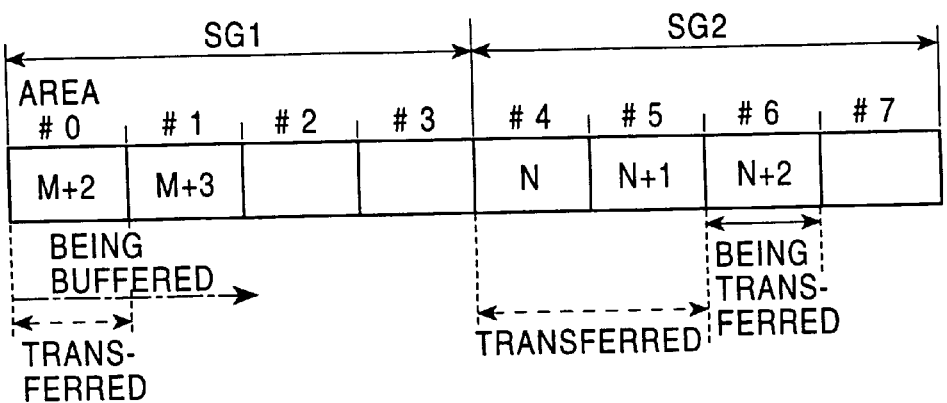
FIG. 18 is a schematic representation of a buffering process during the two-point reading operation according to the embodiment of the invention.

Thus, in step F110 shown in FIG. 2, the cache-hit data with the LBA "N+2" is transferred from the cache memory as shown in FIG. 18. In this case, the data transfer is completed by transferring only the hit-cache data, and thus the buffering operation started in response to the data transfer request (v) is further continued without being terminated.

Thus, as shown in FIG. 18, data with a LBA "M+3" and data with LBAs following that are further buffered into the segment SG1 after completion of the transfer of the cache-hit data with the LBA "N+2".

After that, if another data transfer request for data designated by a requested start address rqLBA=M+3 and a requested data length rqLG=1 is issued as denoted by (vii)

in FIG. 12, then an operation is performed as described below. In this case, the requested data with the LBA "M+3" is found in the segment SG1 of the cache memory.

Figure 19:
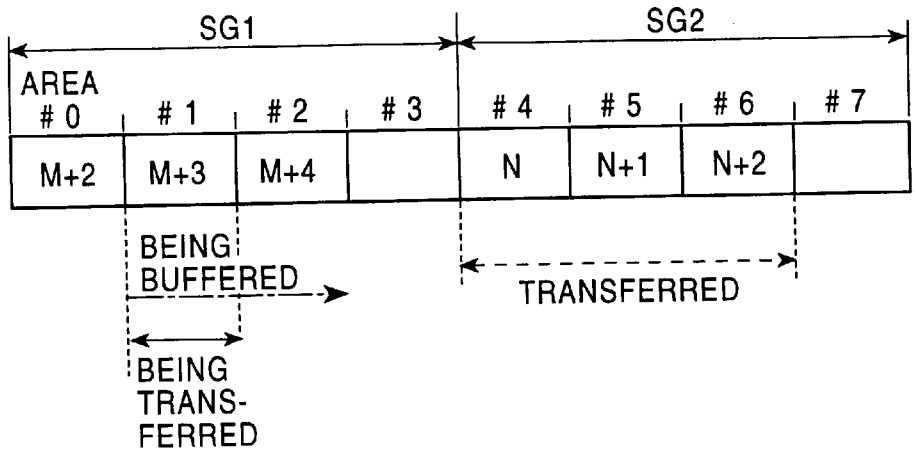
FIG. 19 is a schematic representation of a buffering process during the two-point reading operation according to the embodiment of the invention.

Thus, in step F106 shown in FIG. 106, the cache-hit data with the LBA "M+3" is transferred as shown in FIG. 19. Also in this case, the data transfer is completed by transferring only the hit-cache data and thus the buffering operation started in response to the data transfer request (v) is further continued without being terminated.

When data with LBAs up to "M+4" have been buffered into the segment SG1, if a data transfer request for data designated by a requested start address rqLBA=N+3 and a requested data length rqLG=1 is issued as denoted by (viii) in FIG. 12, an operation is performed as described below. In this case, the requested data with the LBA "N+3" cannot be found in the cache memory.

Figure 20:
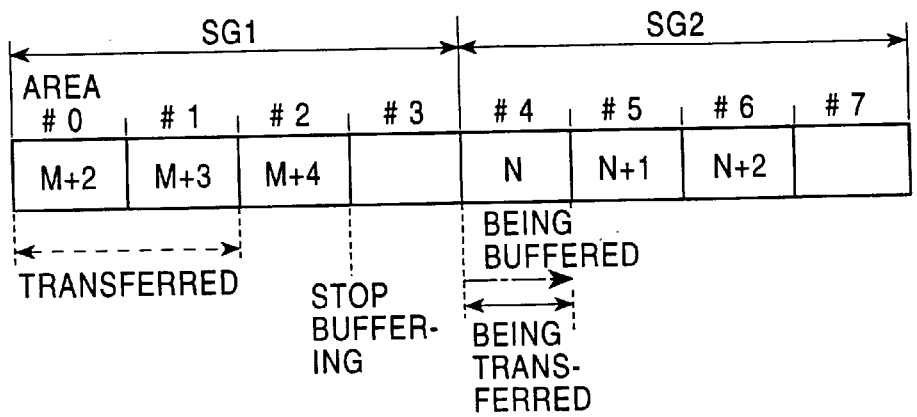
FIG. 20 is a schematic representation of a buffering process during the two-point reading operation according to the embodiment of the invention.

As a result, the process goes to step F117 at which the operation of buffering data into the segment SG1 is stopped and data with an LBA "N+3" and data with LBAS following that are buffered into the SG2 as shown in FIG. 20.

In the operation on the disk 90, the buffering started when the reading operation RD12 shown in FIG. 12 was performed is stopped, and the buffering into the segment SG2 is started when the accessing operation AC14 and the reading operation RD14 are performed.

Of the buffered data, the requested data with the LBA "N+3" is transferred to the host computer.

In the present embodiment of the invention, as can be seen from the above description, a two-point reading operation is performed using the cache memory as a segment buffer in an extremely effective manner thereby maximizing the probability that requested data can be transferred from the cache memory.

That is, in the present embodiment, the usage of the cache memory 20 makes a significant contribution to the reduction in the access time even for data transfer requests in the two-point reading mode.

The buffering operation is now described below with reference to FIG. 21 for the case where it is determined that the data transfer request is a random reading request and thus process goes to step F113 in FIG. 2.

At the first time that the data transfer request is determined to be a random reading request, the data buffered in the segments SG1 and SG2 or the data buffered in the cache memory in the ring memory mode is entirely purged as described earlier.

Figure 21A:
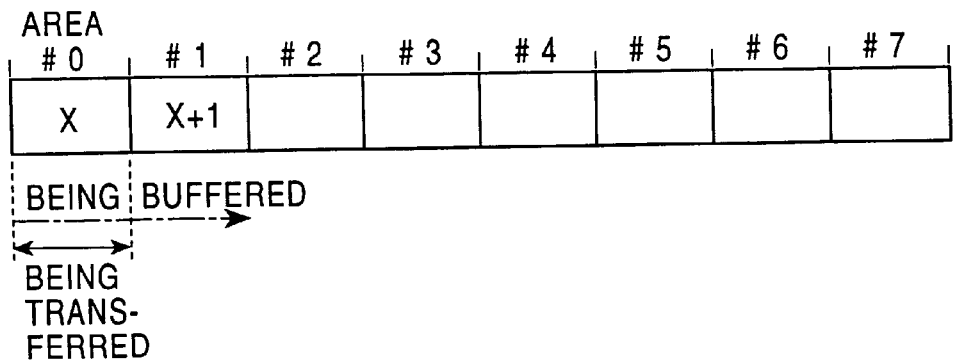
FIG. 21 is a schematic representation of a buffering process during a random reading operation according to an embodiment of the invention.

After that, data associated with the data transfer request is buffered into the cache memory 20 starting from for example the first area. More specifically, if a data transfer request for data with a LBA "X" is received, then the data with the LBA "X" and data with LBAs following that are buffered in the areas starting from #0, and the requested data with the LBA "X" is transferred as shown in FIG. 21A.

Figure 21B:
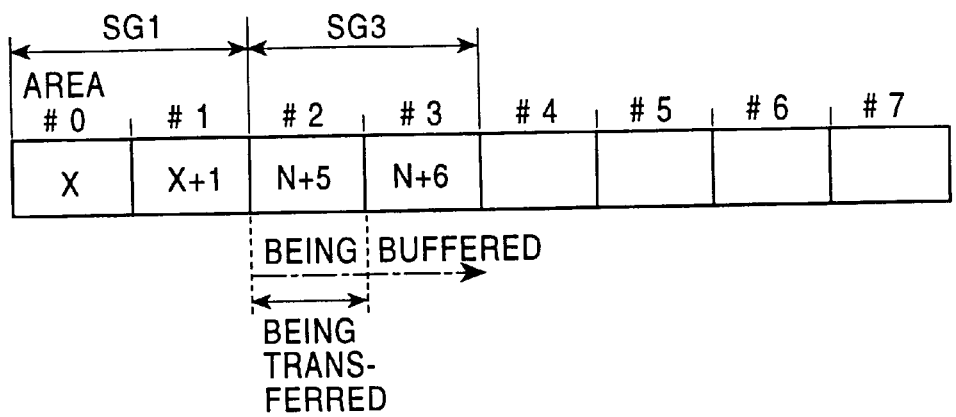

If a data with a LBA "N+5" is designated by a next data transfer request and thus if it is determined that the data transfer request is also a random reading request, then the process goes to step F113 and an operation is performed as follows. In this case, as shown in FIG. 21B, a segment is created in the cache memory 20 at a location following the area in which the above-described buffered data is held, and data with the LBA "N+5" and data with LBAs following that are buffered into the created segment. The requested data with the LBA "N+5" is transferred.

Figure 21C:
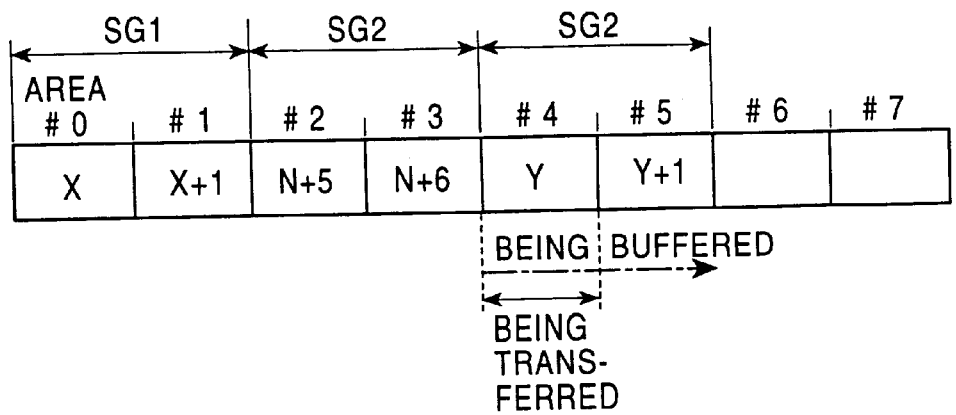

After that, if a data with a LBA "Y" is designated by a further data transfer request, and thus if it is determined that the data transfer request is also a random reading request, then the process goes to step F113 and an operation is performed as follows. In this case, as shown in FIG. 21C, another segment is created in the cache memory 20 at a location following the area in which the above-described buffered data is held, and data with the LBA "Y" and data with LBAs following that are buffered into the newly created segment. The requested data with the LBA "Y" is transferred.

As described above, a segment is created each time a data transfer request is generated and data associated with each data transfer request is buffered in the created segment while keeping the existing buffered data without discarding it. That is, when data transfer requests of the random reading request type are successively issued, new data is added to the cache memory while keeping the existing buffered data each time a data transfer request is generated.

The above-described method of buffering data maximizes the chance of transferring data using the existing buffered data even in the random reading mode. That is, some data is transferred from the cache memory and thus a reduction in the access time can be achieved.

Although the present invention has been described above with reference to preferred embodiments, the construction and the buffering operation may be modified in various manners within the scope of the present invention. More specifically, the buffering operation is not limited to that shown in FIG. 2, but the buffering operation may also be performed in different manners depending on the type of data transfer request so as to increase the probability that hit data can be found in the cache memory.

As can be understood from the above description, the present invention has various advantages. The request type of a given data request is determined and the mode (buffering mode) of storing data into cache memory means is determined depending on the determined request type. This flexible operation depending on the request type makes it possible to use the data stored in the cache memory means in an extremely efficient fashion.

In particular, when it is determined that the type of data request is not a sequential data request the cache memory means is divided into a plurality of memory segments and data is stored in a particular memory segment so that the existing data buffered in the cache memory is further kept in the respective segments without being entirely purged even in a mode other than the sequential reading mode. This makes it possible that the data kept in the cache memory (without being purged) is used, for example, in a two-point reading operation performed in response to the following data transfer request. That is, there is a possibility that data is transferred from the cache memory even in the two-point reading mode.

Yet even in the random reading mode, the data buffered in the past is kept in the divided segments of the cache memory as long as possible so as to maximize the probability that requested data can be found in the cache memory in the future operations.

On the other hand, in the case where it is determined that the type of a given data request is a sequential data request, data is buffered in the cache memory means using it as a single ring memory in such a manner as to efficiently use the capacity of the cache memory means thereby increasing the cache-hit probability.

Furthermore, the mode of buffering data into the cache memory means is switched to an optimum mode depending on the result of determination as to whether the data request is a two-point reading request or a random reading request. More specifically, if the data request is a two-point reading request, the cache memory means is divided into two memory segments so as to increase the cache-hit probability in the two-point reading mode. On the other hand, if the data request is a random reading request, the number of memory segments is increased so as to increase the cache-hit probability in the random reading mode.

As a result of the increased cache-hit probability achieved by selecting an optimum mode of buffering data into the cache memory means depending on the data request type, a great reduction is achieved in the number of operations of getting access to a storage medium such as a disk and thus in the average access time during the operation of transferring data in response to a data request.

The above-described process according to the present invention can be easily realized by means of firmware of the reproducing apparatus without having to change the hardware configuration.

What is claimed is:

1. A reproducing apparatus, comprising:

reading means for reading data from a storage medium;

cache memory means for storing the data read from said reading means; and reproduction control means for controlling the operation of said reading means and/or the operation of said cache memory means depending on a data request so that the requested data is transferred from said cache memory;

wherein said reproduction control means determines the request type of the received data request and sets a mode of storing data in said cache memory depending on the determined request type; and further wherein when said reproduction control means determines that the request type is not a sequential data request, said reproduction control means divides said cache memory into a plurality, of memory segments and stores data into corresponding particular memory segments such that existing data buffered in said cache memory is maintained in the respective memory segments.

2. The apparatus of claim 1 wherein in the case where said reproduction control means determines that the request type is a sequential data request, said reproduction control means stores data into said cache memory using it as a single ring memory.

3. A method of caching data, comprising the steps of:

determining whether the request type of a received data request is a sequential data request; and in the case where the request type is a sequential data request, storing data into a cache memory using it as a single ring memory; and in the case where the request type is not a sequential data request, dividing said cache memory into a plurality of memory segments and storing data into corresponding particular memory segments such that existing data buffered in said cache memory is maintained in the respective memory segments.

4. A reproducing apparatus, comprising:

reading means for reading from a storage medium; cache memory means for storing data the read from said reading means; and reproduction control means for controlling the operation of said reading means and/or the operation of said cache memory means depending on a data request so that the requested data is transferred from said cache memory;

wherein said reproduction control means determines the request type of the received data request and sets a mode of storing data in said cache memory depending on the determined request type;

wherein in the case where said reproduction control means determines that the request type is not a sequential data request, said reproduction control means divides said cache memory into a plurality of memory segments and stores data into a memory segment whereas in the case where said reproduction control means determines that the request type is a sequential data request, said reproduction control means stores data into said cache memory using it as a single ring memory; and further wherein in the case where said reproduction control means determines that the request type is not a sequential data request, said reproduction control means further determines whether said request type is a random data request and changes the mode of storing data in the cache memory means depending on the result of said determination.

5. The apparatus of claim 4 wherein in the case where said reproduction control means determines that the request type is an alternate two point request, said reproduction control means divides said cache memory into a first memory segment and a second memory segment and buffers the data at one point on said storage medium in the first memory segment and the data at the other point in the second memory segment.

6. The apparatus of claim 4 wherein in the case where said reproduction control means determines that the request type is a random data request, said reproduction control means divides said cache memory into a plurality of memory segments each time such a type of data request is generated and holds the existing data, which has been buffered in response to past random data requests, in said plurality of memory segments.

7. A reproducing apparatus, comprising:

a reading data unit for reading from a storage medium;

a cache memory for storing the data read from said reading unit; and a reproduction controller for controlling the operation of said reading unit and/or the operation of said cache memory depending on a data request so that the requested data is transferred from said cache memory;

wherein said reproduction controller determines the request type of the received data request and sets a mode of storing data in said cache memory depending on the determined request type;

wherein in the case where said reproduction controller determines that the request type is not a sequential data request, said reproduction controller divides said cache memory into a plurality of memory segments and stores data into a memory segment whereas in the case where said reproduction controller determines that the request type is a sequential data request, said reproduction controller stores data into said cache memory using it as a single ring memory; and further wherein in the case where said reproduction controller determines that the request type is not a sequential data request, said reproduction controller further determines whether said request type is a random data request and changes the mode of storing data in the cache memory depending on the result of said determination.

8. The apparatus of claim 7 wherein in the case where said reproduction controller determines that the request type is an alternate two point request, said reproduction controller divides said cache memory into a first memory segment and a second memory segment and buffers the data at one point on said storage medium in the first memory segment and the data at the other point in the second memory segment.

9. The apparatus of claim 7 wherein in the case where said reproduction controller determines that the request type is a random data request, said reproduction controller divides said cache memory into a plurality of memory segments each time such a type of data request is generated and holds the existing data, which has been buffered in response to past random data requests, in said plurality of memory segments.

10. A reproducing method, comprising the steps of:

reading data from a storage medium;

storing data read from said reading step in a cache memory; and controlling the operation of said reading step and/or the operation of said storing step depending on a data request so that the requested data is transferred from said cache memory;

wherein said controlling step determines the request type of the received data request and sets a mode of storing data in said cache memory depending on the determined request type;

wherein in the case where said controlling step determines that the request type is not a sequential data request, said step of controlling including the step of dividing said cache memory into a plurality of memory segments and stores data into a memory segment whereas in the case where said controlling step determines that the request type is a sequential data request, said controlling step including the step of storing data into said cache memory using it as a single ring memory; and further wherein in the case where said controlling step determines that the request type is not a sequential data request, said controlling step further including the step of determining whether said request type is a random data request and changing the mode of storing data in the cache memory depending on the result of said determination.

11. The method of claim 10 wherein in the case where said controlling step determines that the request type is an alternate two point request, said controlling step including the step of dividing said cache memory into a first memory segment and a second memory segment and buffering the data at one point on said storage medium in the first memory segment and the data at the other point in the second memory segment.

12. The method of claim 10 wherein in the case where said controlling determines that the request type is a random data request, said controlling step including the step of dividing said cache memory into a plurality of memory segments each time such a type of data request is generated and holds the existing data, which has been buffered in response to past random data requests, in said plurality of memory segments.

* * * * *

UNITED STATES PATENT AND TRADEMARK OFFICE
CERTIFICATE OF CORRECTION

PATENT NO.    : 6,279,076 B1
DATED         : August 21, 2001
INVENTOR(S)   : Yukio Shishido et al.

It is certified that error appears in the above-identified patent and that said Letters Patent is hereby corrected as shown below:

Column 12,
Line 56, after "generated", insert -- . --.
Line 56, delete "of", the first occurrence, and insert -- Of --.

Column 13,
Line 26, delete "M⇆" and insert -- M --.

Column 16,
Line 47, delete "an" and insert -- a --.

Column 17,
Line 50, delete "IN" and insert -- "N" --.

Column 21,
Line 61, after "the" insert -- data --.

Signed and Sealed this

Nineteenth Day of November, 2002

Attest:

Attesting Officer

JAMES E. ROGAN
Director of the United States Patent and Trademark Office